Nov. 22, 1966   E. H. FISHER   3,286,654
CONVERTIBLE RAIL-HIGHWAY VEHICLE
Filed Aug. 29, 1963   3 Sheets-Sheet 1
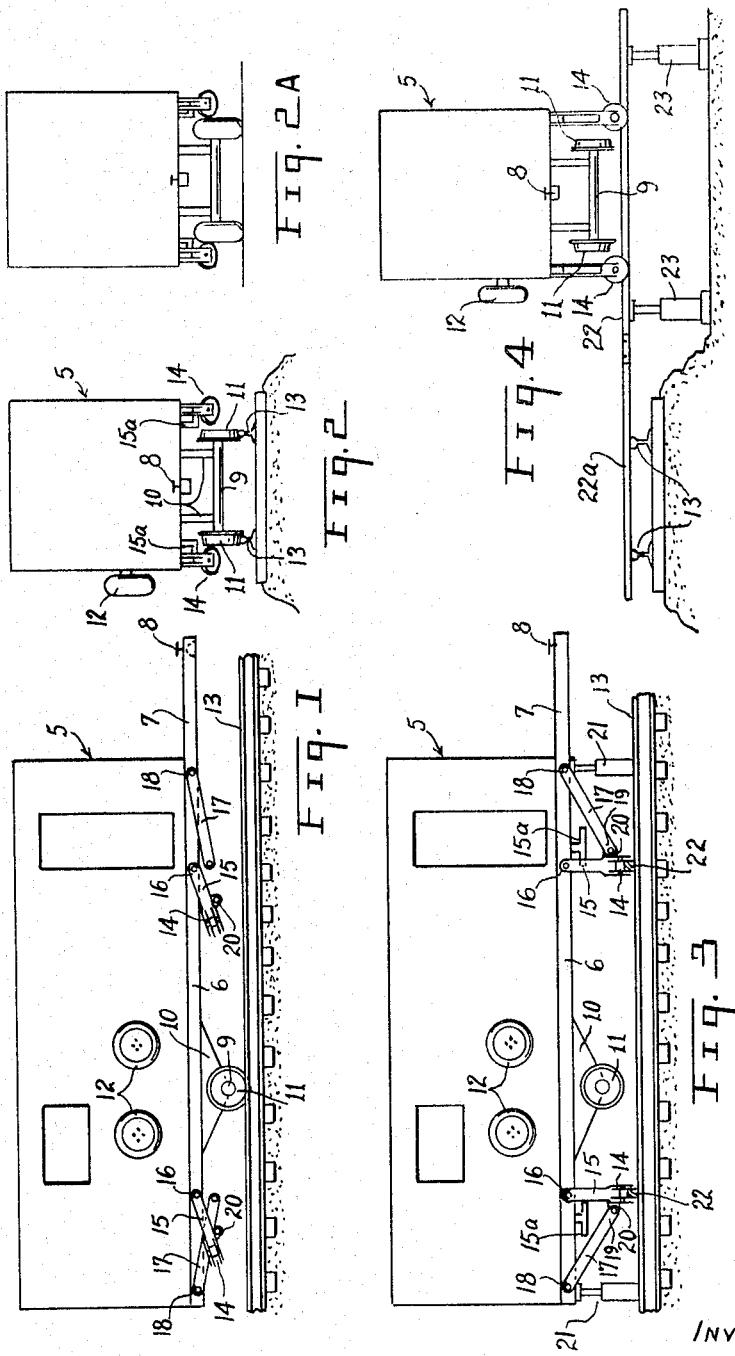
INVENTOR
E. H. FISHER
Fetherstonhaugh & Co.
ATTORNEYS

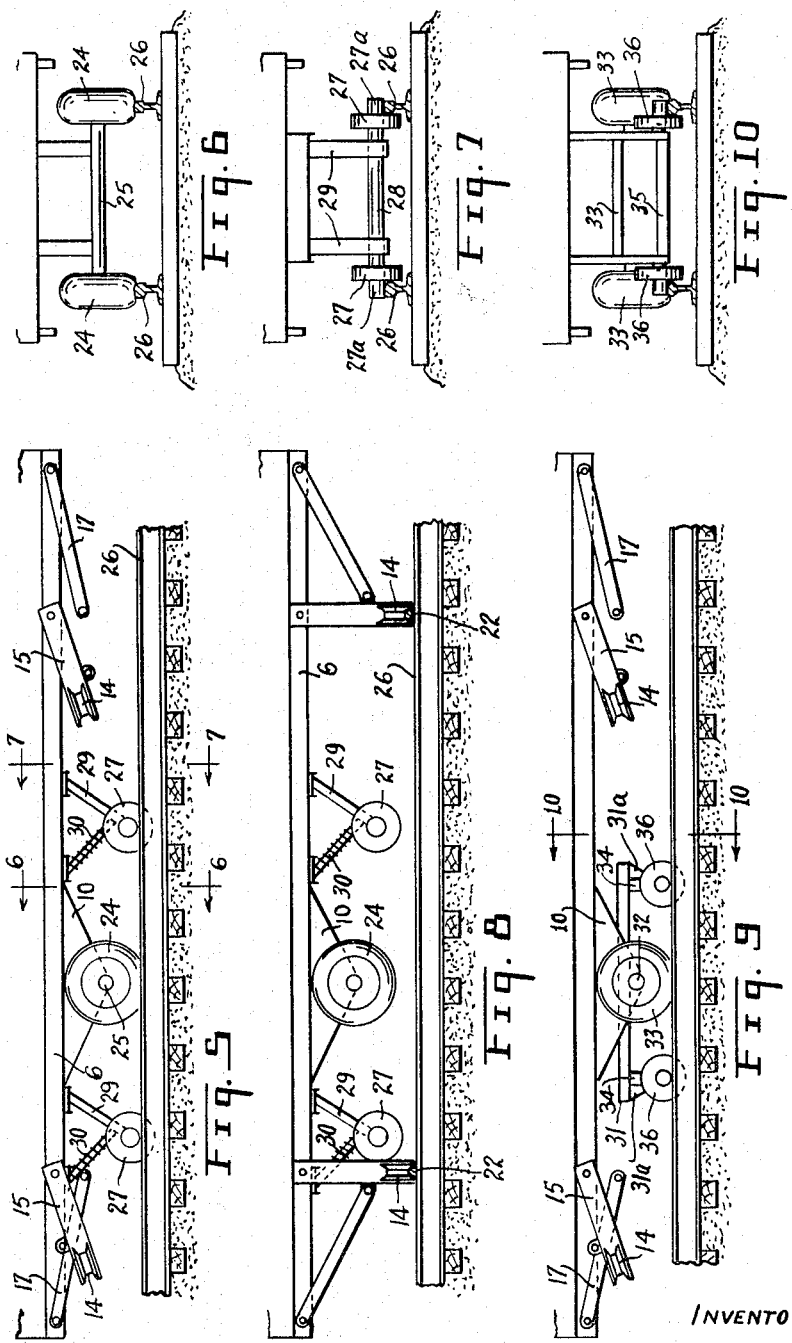

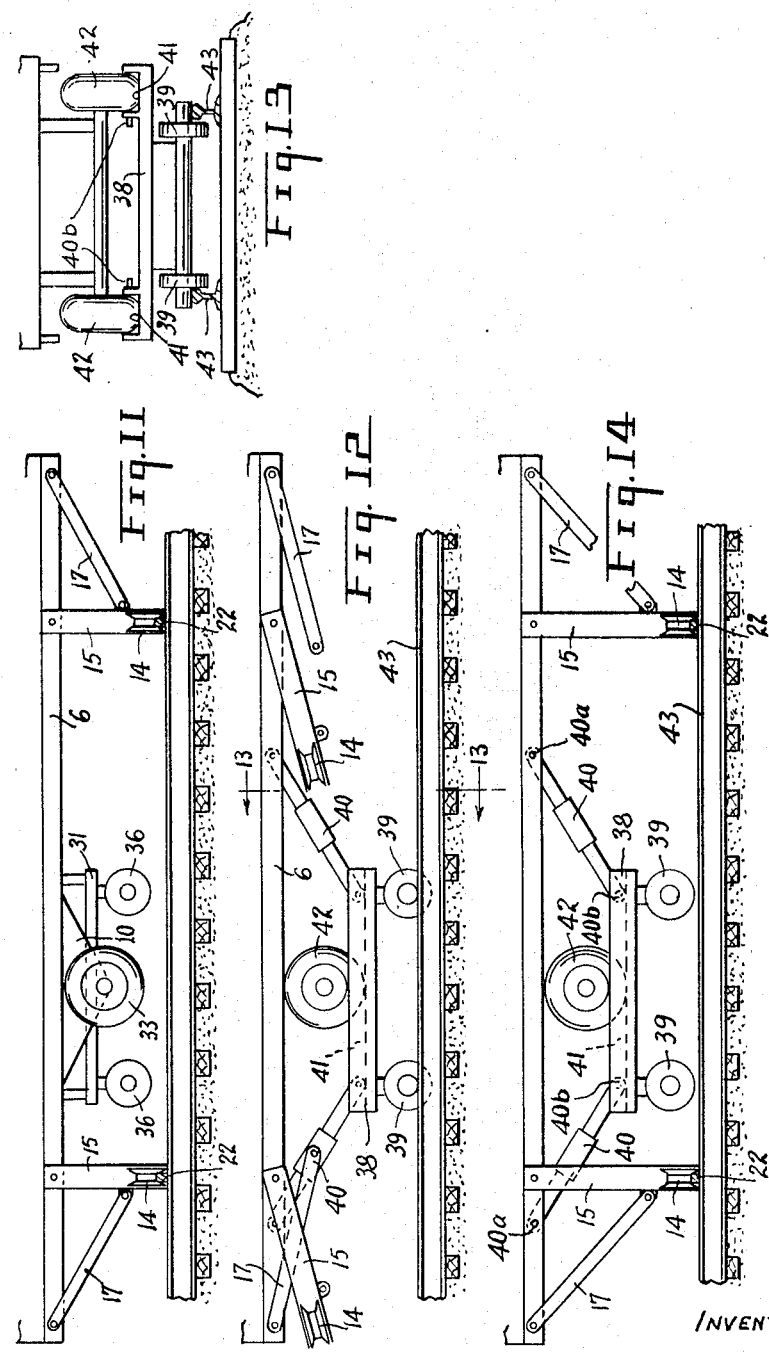

United States Patent Office 3,286,654
Patented Nov. 22, 1966

3,286,654
CONVERTIBLE RAIL-HIGHWAY VEHICLE
Earl H. Fisher, 630 Casgrain Ave., St. Lambert,
Montreal, Quebec, Canada
Filed Aug. 29, 1963, Ser. No. 305,492
Claims priority, application Canada, June 22, 1963,
878,536
3 Claims. (Cl. 105—177)

This invention relates to trailers which can be readily converted for running on railway rails or on a highway and includes a set-off means whereby the trailer can be set off the track, if desired, at any suitable location along the right-of-way and returned to the rails for movement, as required.

In the past, in railway track maintenance, it had been necessary to locate the highway type of trailer at the closest location to the work site permitted by suitable road facilities or to locate on-track bunk and boarding and other railway cars at a siding or passing track in proximity to the work site. The workmen had to travel greater distances to and from the aforementioned housing accommodation as the work progressed away from such more-or-less fixed locations. This shortened the productive work day to permit the workmen to return to the aforementioned housing accommodation within the allotted work day. In addition, on completion of the work on the rail line within a reasonable distance outwards from the location of either of the two aforementioned type of housing and boarding facilities, it had been the practice in the past to either move the highway trailer by road, by means of suitable automotive type of equipment, to the next acceptable housing and boarding location to the work site or move the on-track bunk and boarding facilities to a suitable siding or passing track by means of an on-track locomotive. Generally the latter equipment is moved in a train. The work gang would then be ready to move out from a new housing location to a new job site.

As the work area is extended away from the highway type trailer or the on-track housing facility, more and more time is taken up in the work gang going to the work location and returning to the trailer or the on-track facility. This also happens when tools, equipment, and supplies have to be moved back and forth by the work gang. Other delays may be incurred by:

(a) Inability to move the on-track bunk and boarding car because of traffic conditions or available means to provide locomotive power for the movement.

(b) Necessity to arrange and move the trailer by road to a new location.

The present invention overcomes the above difficulties in that the proposed highway-rail can can be moved on the railway track to keep up with the forward movement of work gangs and be moved off the track at any location where set-off rails can be set up without being limited to siding locations as in the case where bunk and boarding cars are used for housing and boarding facilities, or where trailers are spotted near the work location contingent upon accessible roads. In addition, where work locations are separated by relatively long distances, the trailer can be quickly converted for highway travel and be taken from the railway track at a location reasonably close to the highway, driven along the highways to another location reasonably close to the railway and set back on the rail tracks. Also, the trailer can be removed from the rail track at convenient locations during peak periods of traffic on the line with little or no interruption of line traffic or of the work on the line.

The invention consists essentially in providing a vehicle of the trailer type with two sets of wheels interchangeable with each other. One set of pneumatic wheels for use in highway travel and the other set for use in travelling along the rails of a railroad.

Also included is a set of set-off wheels mounted on the ends of brackets which are pivotally mounted on the vehicle and can be braced in a vertical position below the vehicle for engagement with set-off rails set transverse to the main rail line for the purpose of moving the vehicle sideways to a position along side the rail line.

When not in use, the set-off wheel brackets are pivoted into a position under the vehicle and secured. In one arrangement the highway wheels and the rail wheels are interchangeable with each other on a common axle. Alternatively, the highway pneumatic wheels can be permanently mounted on an axle and run on the rails as well as on the highway. An additional pair of axles are located fore and aft of the pneumatic tired wheels and each carry a pair of dish wheels inwardly on the rails and serving to hold the vehicle and its pneumatic wheels against sideways movement on the rails. An outwardly extending portion of the dished wheels run on the rails and takes a portion of the load of the vehicle, thereby reducing the load on the pneumatic wheels bearing on the rails. In this arrangement, the dished wheels are held in their operative position by spring mounted braces and can be moved upwards under the vehicle when the vehicle is operated on the highway.

In another embodiment of the invention, the dish wheels are mounted on axles located on a cradle, located above the axle carrying the pneumatic wheels. This cradle can be moved down to bring the dish wheels into engagement with the rails to hold the vehicle in transverse alignment and the pneumatic wheels in engagement with the top surface of the rails or moved upwards to permit free travel of the vehicle on the pneumatic wheels on the highway. In this assembly, the load of the vehicle is taken on the pneumatic wheels, the outwardly extending portion of the dished wheels is for safety only and come in contact with the rail in the event of a flat tire or tires. In still another embodiment of the invention, a dolly having two pairs of dish wheels and a pair of spaced-apart troughs to receive the pneumatic wheels is connected to the vehicle chassis by removable turnbuckles. When the vehicle is intended for travel on the rails, the dolly is engaged with the vehicle chassis and the turnbuckles are tightened to bring the troughs of the dolly into contact with the pneumatic wheels. In this assembly, total load of the vehicle is transmitted through the pneumatic wheels and dished wheels. For highway travel, the dolly is removed from under the vehicle and carried by it in any convenient manner.

The primary object of the invention is to provide a trailer type vehicle for use in railroad maintenance work which can be readily moved from place to place, either on the railroad tracks or along the highway and can be readily moved from railroad tracks to highway or vice-versa.

A further object of the invention is to provide a trailer type vehicle with both rail and highway wheels and be provided with set-off wheels for transfer of the vehicle from the railway tracks to a highway or vice-versa.

A further object of the invention is to provide a trailer type vehicle which can be moved from one location to another along the railroad tracks by the unit of equipment actually doing the work, or another piece of equipment suitable for this purpose and can be readily moved off the railroad tracks to permit the passage of normal railroad traffic.

A further object of the invention is to provide a pneumatic tired vehicle which can run on rails with provision to partially relieve the load of the vehicle on the pneumatic tires by providing additional dish wheels which, in addition to carrying a part of the load, maintains the vehicle central with respect to the rails.

A further object of the invention is to provide a trailer type vehicle for rail travel with sets of set-off wheels which can be lowered into engagement with set-off rails and be secured under the vehicle when the vehicle is running on either rails or on a highway.

In summary, by way of illustration and not limitation, the advantages of the dual purpose highway-rail trailer arrangement are:

Section A (1) Reduction in inventory of railway bunk and boarding cars, supply cars and tool cars used for maintenance of way work.

(2)* Reduction in the cost of stopping, starting and delays to freight, way freight and work trains presently having to pick up, move or place bunk and boarding cars, tool and supply cars, also flat cars carrying equipment.

(3)* Increase available productive time of men and machines, by eliminating the time that work gangs have to await freight, way freight or work train movements of accommodation and equipment.

(4)* Increase productive time of men and machines presently lost by travelling to and from lodgings at fixed locations (sidings) through immediate advancement and set-off close to the work site of the more mobile accommodation.

(5)* Decrease overtime payment occasioned by gangs waiting for late train movements of equipment and boarding facilities.

(6)* Decrease living expenses for gangs that move several miles a day and are presently being housed in commercial accommodation.

(7) Improve work scheduling of work equipment and roadway machines because arrangements for obtaining on-track car equipment and transportation will not have to be made.

(8)* Reduce the number of work gangs required to handle the same volume of work because of the increased productive time available for both men and machines arising from independent and accelerated mobility of gangs.

(9)* Reduce documentation and administration expense for the assignment and movement of men and machines because of the independent movements that would be possible and because of the fewer and more mobile work gangs.

(10)* Reduce loss and damage to cars or contents and to machines in transit because the hazards of shunting are not inherent in hooking up a trailer to a machine.

(11)* Reduce the use of sidings for car equipment on line with work equipment and roadway machines.

(12) Reduce the amount of track required for storage of bunk and boarding cars, etc., as the highway-rail house trailers will be stored off track in an enclosed yard possibly near a shop.

(13) Reduce losses from vandalism because the highway-rail house trailer could be stored in a fenced yard.

(14)* Reduce expenses as switching and marshalling nonrevenue equipment cars to overcome delays in placing equipment in service.

(15) Enable movement of accommodation either by highway or rail.

Section B

Allowing certain units of work equipment or roadway machines to travel to work sites under their own power while hauling a highway-rail house trailer will:

(1) Eliminate loading, blocking and unloading such equipment which presently occurs at the shop and in the field with the following results:

---

* These advantages are contingent upon trailers being hauled, for example, by a unit of work equipment or roadway machine.

(i) Increase available production time for men and machines;

(ii) Reduction in accident and damage risk to personnel and equipment;

(iii) Elimination of cost of material used for blocking equipment on flat cars;

(iv) Free flat cars and box cars used for this nonrevenue service.

(2) Reduce roadway machines and work equipment inventory because the increased productive time available will allow the same volume of work to be done with fewer machines.

(3) Allow railways to take greater advantage of technological improvements because increased utilization of equipment will expend equipment life in a shorter period of time, reducing the machine obsolescence factor.

(4) Reduce the ratio of maintenance cost to hours of machine service because of increased productivity.

(5) Permit realization of the advantages marked with an asterisk as outlined under the foregoing Section A.

These advantages and the aforementioned objects of the invention will be apparent from the following detailed description and the accompanying drawings, in which:

FIG. 1 is a side elevation of a trailer-type vehicle equipped with replaceable flanged wheels for running on a railroad track and carrying a set of pneumatic wheels to replace the flanged wheels for highway travel, and showing a set of set-off wheels supported under the vehicle chassis.

FIG. 2 is an end elevation of the vehicle shown in FIG. 1.

FIG. 2A is a view similar to FIG. 2 but showing the vehicle resting on a highway road surface.

FIG. 3 is a side elevation similar to FIG. 1 but showing the vehicle elevated and the set-off wheels lowered into engagement with set-off rails.

FIG. 4 is an end elevation of the arrangement shown in FIG. 3 and showing the vehicle moved sideways on the set-off rails clear of the railroad tracks.

FIG. 5 is a partial side elevation of the trailer-type vehicle but to a larger scale and showing one arrangement of pneumatic wheels and dish wheels in engagement with the rails and the set-off wheels in the raised position.

FIG. 6 is a transverse vertical section on the line 6—6 of FIG. 5.

FIG. 7 is a transverse vertical section on the line 7—7 of FIG. 5.

FIG. 8 is a side elevation similar to FIG. 5 but showing the vehicle elevated and the set-off wheels lowered into engagement with the set-off rails.

FIG. 9 is a side elevation similar to FIG. 5 but showing a modified arrangement of pneumatic wheels and dish wheels.

FIG. 10 is a transverse vertical section on the line 10—10 of FIG. 9.

FIG. 11 is a side elevation similar to FIG. 9 but showing the vehicle elevated and the set-off wheels lowered into engagement with the set-off rails.

FIG. 12 is a side elevation of the vehicle similar to FIG. 9 but showing a still further modification of the pneumatic wheels and dish wheels and making use of a removable dolly.

FIG. 13 is a transverse vertical section on the line 13—13 of FIG. 12.

FIG. 14 is a side elevation similar to FIG. 12 but showing the vehicle elevated and the set-off wheels lowered into engagement with the set-off rails.

Referring to the drawings, the trailer type vehicle 5 is designed for use either for the accommodation of workmen, and for the storage and/or transportation of equipment, tools and supplies for use in railroad maintenance. It is designed for travel either directly on railroad tracks or on the highway. The vehicle 5 is provided with an underchassis 6 and the forwardly extending bracket 7 carrying the usual attachment 8 for connecting the trailer 5, either to an automotive vehicle for highway travel, or to unit of work equipment or roadway machine that will provide locomotive power to haul the trailer along the railroad rails.

In the simplest and least expensive form of the invention illustrated in FIGS. 1 to 4, the vehicle 5 is provided with a wheel supporting axle 9 carried by a springing arrangement 10 on the underside of chassis 6. A pair of flanged wheels 11 are shown mounted on the axle 9 and adapted for rail travel of the vehicle. A pair of pneumatic wheels 12 are shown carried on the side of the vehicle 5. These pneumatic wheels 12 can be substituted for the flanged wheels 11 when the vehicle is to be operated on a highway.

In order to quickly transfer the vehicle 5 on or off the rails 13, the vehicle is fitted with two pairs of set-off wheels 14 mounted on the ends of the brackets 15 whose ends opposite from the wheels 14 are pivoted at 16 to the vehicle chassis 6. Any suitable catch means 15a are employed to support the brackets 15 up under the chassis 6 when the vehicle is running on the rails 13 or on the highway. A brace member 17 pivoted to the chassis 6 adjacent to each bracket 14 at 18 has its opposite end 19 secured to the boss 20 on the bracket 14. The brackets, to which set-off wheels 14 are attached are lowered into the vertical position as shown in FIG. 3. The means 15a for holding the brackets 15 up under the chassis 6 can also be employed to hold the brace member 17 in the raised position.

A pair of jacks 21 are employed to raise the vehicle 5 sufficiently to permit a set of set-off rails 22 to be laid across the top of the rails 13 under the set-off wheels 14. The set-off rails 22 extend sideways beyond the rails 13 and are provided with removable sections 22a directly over the rails 13 which can be removed to permit passage of other traffic over the rails while the vehicle is located on the set-off rails to the side of the track. The level of the set-off rails 22 is maintained by means of the jacks 23 which, after the flanged wheels 11 have been replaced by the pneumatic wheels 12, can be lowered to permit the pneumatic wheels to make contact with the ground and the vehicle removed for travel on a highway. The reverse operation can be carried out by taking the vehicle from the highway and locating it across the set-off rails 22, jacking the set-off rails upwards and replacing the pneumatic wheels 12 with the flanged wheels 11, thence moving the vehicle along the set-off rails and then lowering it on to the rails 13.

In the modification shown in FIGS. 5 to 8 the pneumatic wheels 24 are permanently journalled on the axle 25 at a gauge which will permit them to run on the top of the rails 26. In order to maintain the vehicle central and the pneumatic wheels 24 in contact with the top of the rails 26 the vehicle is provided with two pairs of dish wheels 27 journalled on the axles 28 which in turn are supported by the brackets 29 and braced by the spring braces 30 to hold contact with the rails 26.

The outwardly extending portion 27a of the wheels 27 run on top of the rails 26 and are maintained thereon by the spring braces 30 regardless of the amount of compression of the pneumatic wheels 24 on the rails, due either to variations in air pressure in the wheel tires or to the load of the vehicle.

In FIGS. 9 to 11 there is shown a further modification in which a cradle 31 straddles and attaches to axle 32 on which the pneumatic wheels 33 are journalled. The dish wheels 36 under normal operating conditions when the trailer is travelling on the rail carry an axial thrust only. The only time a radial thrust is taken on the outwardly extending portion of the dish wheels is in the event of a circumstance such as a flat tire occurring. Under this arrangement, except for emergency conditions such as a flat tire, the pneumatic tires carry the complete load of a trailer and the dish wheels move up and down with the movement of axle 32. For highway travel, brace 34 is disconnected and a bracket 31a, to which the dish wheels are attached, are swung back under chassis 6. Both brackets and braces are suitably secured under the chassis for highway travel.

In FIGS. 12 to 14 there is shown still another modification of the wheel arrangement. In this arrangement a removable four-wheel dolly 38 equipped with dish wheels 39 is removably attached to the underside of the chassis 6 by means of the turnbuckles 40, the ends of which are secured to the chassis at 40a and to the dolly at 40b. The dolly 38 is provided with a pair of spaced apart longitudinally recessed tracks 41 on its upper side, the said tracks being aligned to receive the pneumatic wheels 42 when the dolly is raised under the wheels by the turnbuckles 40. The dolly 38, as shown in FIGS. 12 and 13, permits the vehicle to be run on the rails 43 and the full load of the vehicle is transferred through the pneumatic wheels 42, the dolly 38 and the dish wheels 39 to the rails 43. When the vehicle is to be used for highway travel, the dolly is separated from the turnbuckles 40 and the vehicle lowered on its pneumatic wheels to highway level, and the turnbuckles are secured under the vehicle chassis 6.

In the operation of this invention the trailer 5 can be moved from place to place along the railroad tracks by coupling to any type of work equipment or roadway machine or other source of railroad locomotive power suitable for hauling this trailer type of equipment or can be moved along the highway by coupling up to any suitable automotive vehicle. The transfer of the trailer from rail to road, or vice-versa, is readily and quickly accomplished by the use of set-off wheels and rails. The length of the brackets 15 supporting the set-off wheels is such that, when the vehicle is supported on the set-off rails, the highway and rail engaging wheels are raised clear of the railroad rails and offer no obstruction to movement of the vehicle along the set-off rails. On the other hand, by pivoting the brackets 15 to the chassis and providing means to support the brackets 15 up under the chassis, the set-off wheels do not interfere with the normal movement of the vehicle either on the rails or highway.

What I claim is:

1. A vehicle adaptable for highway or rail travel, comprising a chassis, axle means supported under the chassis, the axle means having an axis extending transversely of the vehicle, a set of highway wheels and a set of rail engaging wheels rotatably mountable on the axle means, a set of set-off wheels mounted on the chassis and rotatable about axes located in planes perpendicular to the axis of the axle means, the set-off wheels being engageable with removable set-off rails for movement of the vehicle sideways from the direction of the highway or rail travel when the vehicle is elevated to raise the highway and rail engaging wheels out of contact with the highway or rails, brackets mounting said set-off wheels on the chassis, said brackets being pivoted at one end to the chassis, brace means securing the brackets in a vertical position under the chassis, and means holding the brackets and brace means up against the underside of the chassis when the vehicle is supported on the highway or rail engaging wheels.

2. A system for adapting a trailer for travel on a highway or on rails, and for moving it sideways from the highway and rails, comprising, in combination:
   (a) a trailer body;
   (b) an underchassis whereon the trailer body is mounted;
   (c) axle means supported on the underchassis and arranged therebelow, the axle means having an axis extending transversely of the trailer body;
   (d) a set of pneumatic tired wheels;
   (e) a set of rail engaging wheels, (1) the pneumatic tired wheels and the rail engaging wheels being rotatably mountable on the axle means;

(f) a set of set-off wheels mounted on the underchassis, the set-off wheels being rotatable about axes extending perpendicularly to the axle means;

(g) removable set-off rails engageable by the set-off wheels in an operative position of the set-off rails and the set-off wheels whereby the underchassis and trailer body may be moved sideways; and (h) means for elevating the underchassis and trailer body to raise the pneumatic tired wheels and the rail engaging wheels out of contact with the highway or rails in said operative position of the set-off rails and wheels.

3. A vehicle adaptable for highway or rail travel, the said vehicle comprising a chassis, axle means supported under the said chassis intermediate of the length of the vehicle, the axle means having an axis extending transversely of the vehicle, a set of highway wheels having pneumatic tires and a set of rail engaging wheels rotatably mounted on said axle means, means to elevate the said vehicle together with the said wheels, a pair of brackets pivotally mounted on the said chassis at opposite ends of the vehicle and at the sides thereof, a set-off wheel rotatably mounted on the ends of each of said brackets opposite from their pivotal mounting, the said wheels being rotatable about an axis at right angles to the axis of rotation of said highway and rail engaging wheels, the length of said brackets being such that when in the vertical position the said set-off wheels are lower than the horizontal plane of the lowermost point of the tread of the said highway and rail engaging wheels, means to support the said brackets in a pivoted position close under the said chassis, and means to hold the said brackets in a vertical position when the said vehicle is elevated to raise the said highway and rail engaging wheels out of contact with either the highway or rails.

References Cited by the Examiner

UNITED STATES PATENTS

| | | | |
|---|---|---|---|
| 765,211 | 7/1904 | Thompson | 105—177 |
| 929,440 | 7/1909 | Iliff | 105—177 |
| 2,062,801 | 12/1936 | Talon | 105—215 |
| 2,090,768 | 8/1937 | Thomas | 180—1 |
| 2,110,230 | 3/1938 | Main | 105—215 |
| 2,140,421 | 12/1938 | Fageol | 105—215 |
| 2,718,197 | 9/1955 | Bock et al. | 105—215 |
| 2,879,719 | 3/1959 | Gaebler | 105—215 |
| 2,896,553 | 7/1959 | Whisler | 105—215 |
| 2,968,260 | 1/1961 | Scheldrup | 105—215 |
| 3,086,483 | 4/1963 | Scheldrup | 105—215 X |

MILTON BUCHLER, *Primary Examiner.*

ARTHUR L. LA POINT, *Examiner.*

H. BELTRAN, *Assistant Examiner.*